(12) United States Patent
Min et al.

(10) Patent No.: US 9,924,539 B2
(45) Date of Patent: Mar. 20, 2018

(54) DEVICE, SYSTEM AND METHOD OF OFDMA FULL-DUPLEX COMMUNICATION

(71) Applicant: Intel Corporation, Santa Clara, CA (US)

(72) Inventors: Alexander W. Min, Portland, OR (US); Minyoung Park, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 170 days.

(21) Appl. No.: 14/832,553

(22) Filed: Aug. 21, 2015

(65) Prior Publication Data

US 2017/0055284 A1 Feb. 23, 2017

(51) Int. Cl.
| | |
|---|---|
| *H04L 12/24* | (2006.01) |
| *H04W 74/08* | (2009.01) |
| *H04L 5/14* | (2006.01) |
| *H04L 12/729* | (2013.01) |
| *H04L 5/00* | (2006.01) |
| *H04W 28/20* | (2009.01) |
| *H04N 21/266* | (2011.01) |

(52) U.S. Cl.
CPC ............. *H04W 74/08* (2013.01); *H04L 5/003* (2013.01); *H04L 5/14* (2013.01); *H04L 41/0896* (2013.01); *H04L 45/125* (2013.01); *H04W 28/20* (2013.01); *H04N 21/266* (2013.01)

(58) Field of Classification Search
CPC ......... H04L 5/14; H04L 5/16; H04L 12/2439; H04L 41/0896; H04L 45/125; H04N 2201/33364; H04N 21/266; H04W 74/08
See application file for complete search history.

(56) References Cited

U.S. PATENT DOCUMENTS

| | | | | |
|---|---|---|---|---|
| 2010/0034123 A1* | 2/2010 | Razdan | ................... | H04W 4/10 370/277 |
| 2011/0222486 A1* | 9/2011 | Hart | ........................ | H04L 5/001 370/329 |
| 2012/0307804 A1* | 12/2012 | Gorsuch | ................. | H04J 13/16 370/335 |
| 2017/0195107 A1* | 7/2017 | Liu | ........................... | H04L 5/14 |

\* cited by examiner

*Primary Examiner* — Salvador E Rivas
(74) *Attorney, Agent, or Firm* — Schwegman Lundberg & Woessner, P.A.

(57) ABSTRACT

An access point (AP), station (STA) and method of assigning sub-carriers to full-duplex links are generally described. The STAs transmit full-duplex capability to the AP. In response, after winning channel contention, the AP determines communication information including a bandwidth, transmit power and modulation and coding scheme (MCS) for each STA. The bandwidths are independently set by the AP such that a ratio of an expected transmission time of the amount of downlink data using a unit bandwidth to bandwidth is approximately the same for each STA. The AP transmits the communication information to the STAs in a trigger frame. The AP and STAs communicate using Orthogonal Frequency Division Multiple Access (OFDMA) during a full-duplex communication session. The uplink and downlink communications terminate at substantially the same time. Acknowledgement packets are exchanged after the full-duplex communication session.

23 Claims, 5 Drawing Sheets

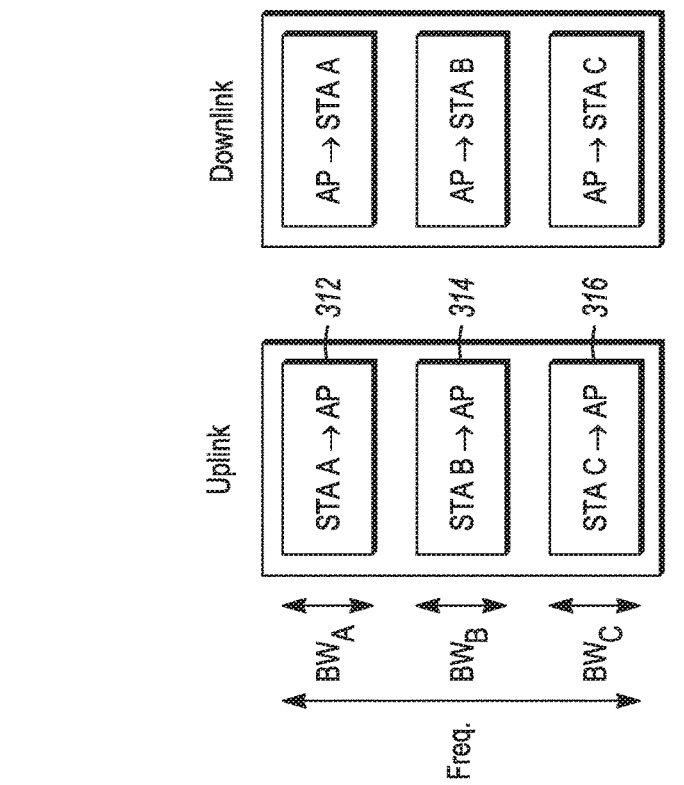
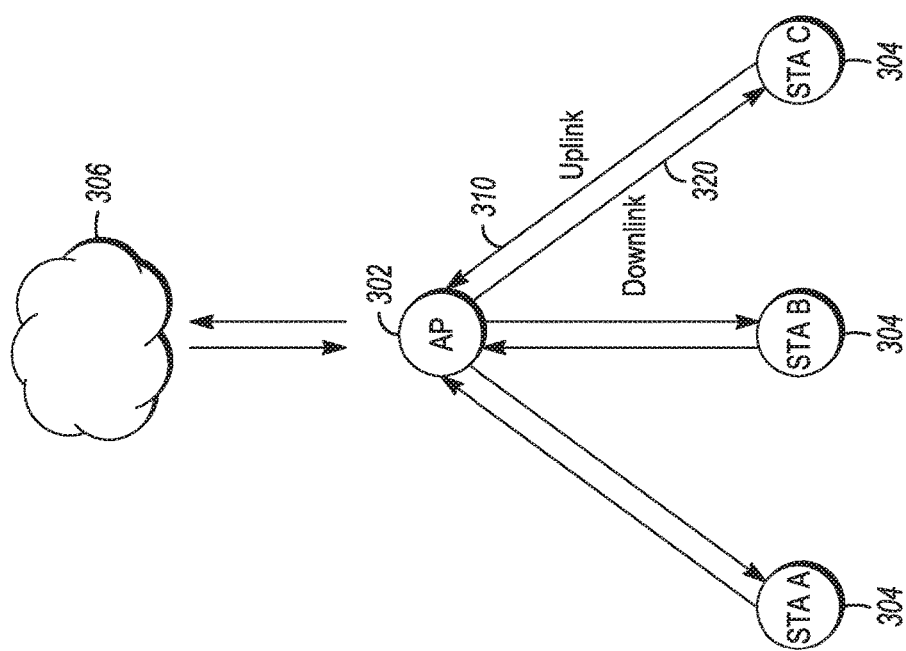
FIG. 3B
FIG. 3A

DEVICE, SYSTEM AND METHOD OF OFDMA FULL-DUPLEX COMMUNICATION

TECHNICAL FIELD

Embodiments pertain to radio access networks. Some embodiments relate to full-duplex communication in cellular networks, including WiFi networks, Third Generation Partnership Project Long Term Evolution (3GPP LTE) networks and LTE advanced (LTE-A) networks as well as $4^{th}$ generation (4G) networks and $5^{th}$ generation (5G) networks.

BACKGROUND

The use of communication devices has increased astronomically over the last two decades. The penetration of mobile devices (also referred to as user equipment (UEs) or stations (STA)), as well as the rapid increase in Machine Type Communication (MTC) devices for the Internet of Things (IoT), in modern society has continued to drive demand for a wide variety of networked devices in a number of disparate environments. The use of networked devices using 3GPP LTE systems has increased in all areas of home and work life.

Unfortunately, the vast explosion of wireless devices has oftentimes resulted in a paucity of spectrum resources. While a number of different technologies presently exist, none is presently able to make adequate use of the available spectrum across the existing types of wireless devices. It may thus be desirable to provide a communication system and one or more techniques that are able to promote increased spectrum efficiency for a wide range of wireless devices that use network resources.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 3A illustrates an access point (AP) in communication with STAs in accordance with some embodiments; FIG. 3B illustrates bandwidths of the communications of FIG. 3A in accordance with some embodiments.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
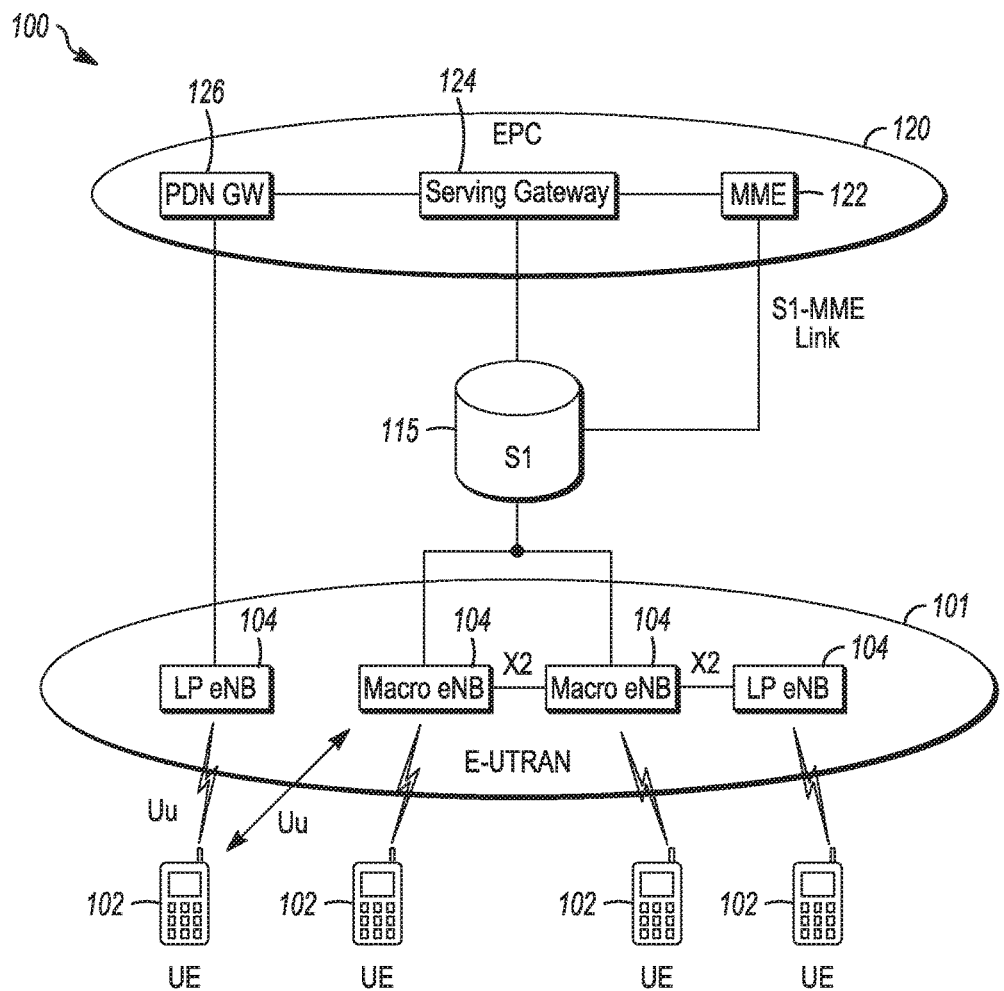
FIG. 1 is a functional diagram of a 3GPP network in accordance with some embodiments.

FIG. 1 is a functional diagram of a 3GPP network in accordance with some embodiments. The network 100 may comprise a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity sake, only a portion of the core network 120, as well as the RAN 101, is shown.

The core network 120 includes mobility management entity (MME) 122, serving gateway (serving GW) 124, and packet data network gateway (PDN GW) 126. The RAN 101 includes eNBs 104 (which may operate as base stations) for communicating with UE 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 101 and routes traffic packets (such as data packets or voice packets) between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates a SGi interface toward the packet data network (PDN). The PDN GW 126 routes traffic packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102 or STA 102. The eNBs 104 may communicate both with UEs 102 in a normal coverage mode and UEs 104 in one or more enhanced coverage modes. In some embodiments, an eNB 104 may fulfill various logical functions for the RAN 100 including but not limited to RNC (radio network controller functions) such as radio bearer management, uplink and downlink dynamic radio resource management and traffic packet scheduling, and mobility management. In accordance with some embodiments, UEs 102 may be configured to communicate via orthogonal multiple access (OMA) communications such as Time Division Multiple Access (TDMA), Frequency Division Multiple Access (FDMA) Orthogonal FDMA (OFDMA), SC-FDMA or other communication signals with an eNB 104 over a multicarrier communication channel in accordance with the appropriate communication technique. The OFDM signals may comprise a plurality of orthogonal subcarriers. In accordance with some embodiments, UEs 102 may be configured to communicate via non-orthogonal multiple access (NOMA) signals.

The S1 interface 115 is the interface that separates the RAN 101 and the EPC 120. It is split into two parts: the S1-U, which carries traffic packets between the eNBs 104 and the serving GW 124, and the S1-MME, which is a signaling interface between the eNBs 104 and the MME 122.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, picocell eNBs may be referred to as an access point (AP) or enterprise femtocell.

The UE may thus communicate with a wireless local area network (WLAN) AP and/or a wireless wide-area network (WWAN) eNB. If the UE is configured to communicate with both the AP and eNB, the UE may include co-located transceivers, each configured to communicate with a different network and a processor configured to coordinate the activities of WLAN and WWAN transceivers to, among other things, mitigate and possibly prevent interference between the transceivers. In some embodiments, the UE and eNB may communicate during active periods and the UE and AP may communicate between active periods. In these embodiments, the UE may transmit a triggering frame immediately after an active period. The triggering frame may indicate a duration of a transmission opportunity between the UE and the AP. In response to receipt of the triggering frame, the AP may transmit data within the transmission opportunity. The WLAN transceiver may be a wireless local area network or a Wireless Fidelity (WiFi) transceiver and may communicate with the AP in accordance with one or more of the IEEE 802.11-2007 and/or IEEE 802.11(n) standards and/or proposed specifications.

Communication over an LTE network may be split up into 10 ms frames, each of which may contain ten 1 ms subframes. Each subframe of the frame, in turn, may contain two slots of 0.5 ms. The eNB may schedule uplink and downlink transmissions over a variety of frequency bands. The allocation of resources in subframes used in one frequency band may differ from those in another frequency band. Each slot of the subframe may contain 6-7 symbols, depending on the system used. In some embodiments, the subframe may contain 12 or 24 subcarriers. A resource grid may be used for downlink and uplink transmissions between an eNB and a UE. The resource grid may be a time-frequency grid, which is the physical resource in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE in the current 3GPP standard. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. The duration of the resource grid in the time domain corresponds to one subframe or two resource blocks. Each resource grid may comprise 12 (subcarriers)*14 (symbols)=168 resource elements for normal cyclic prefix (CP) case. Several different physical channels may be conveyed using such resource blocks.

Figure 2:
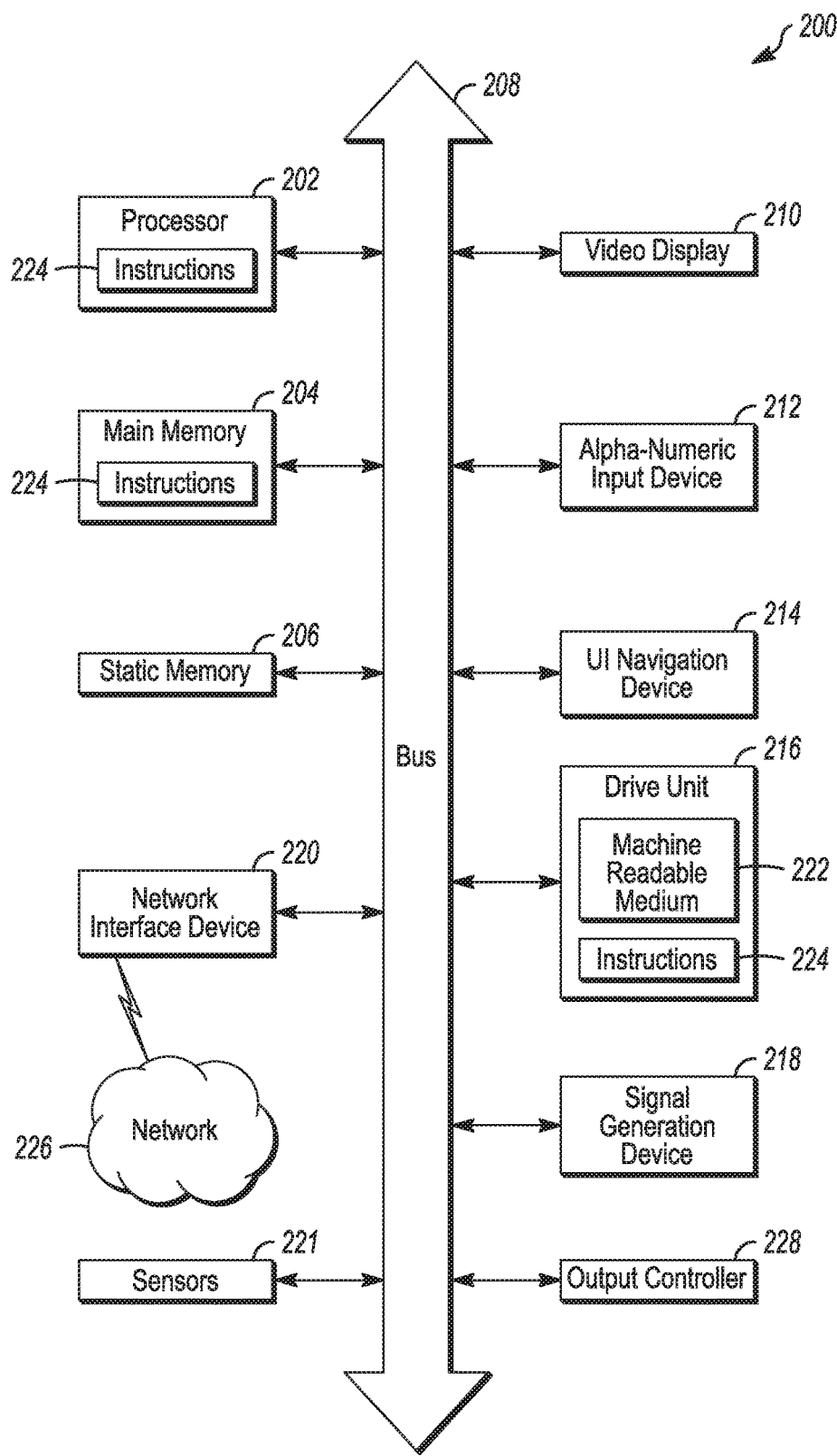
FIG. 2 is a block diagram of a communication device in accordance with some embodiments.

FIG. 2 is a functional diagram of a communication device in accordance with some embodiments. The communication device 200 may be any of the devices in FIG. 1, such as a STA, a UE, an AP, or an eNB, or may also be other electronic devices capable of wireless communication with an AP or eNB, such as a laptop or personal computer (PC), a tablet PC, a set-top box (STB), a personal digital assistant (PDA), a mobile telephone, a smartphone, a web appliance, a network router, switch or bridge, a medical device (e.g., a heart rate monitor, a blood pressure monitor, etc.) or any machine capable of executing instructions (sequential or otherwise) that specify actions to be taken by the communication device 200. In some embodiments, the communication device may be a stationary non-mobile device. In some embodiments the communication device 200 may be a computer configured to perform any one or more of the techniques (e.g., methodologies) discussed herein.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The communication device 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The computer 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The computer 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). The communication device 200 may have dual transceivers to permit full-duplex communications to occur. Moreover, isolation elements (e.g., multiple buffers) may be disposed between transmit and receive paths of the communication device 200 to provide additional isolation. The communication device 200, whether an AP or STA, may be able to essentially completely cancel the self-interference caused by the transmit path and successfully decode received packets.

The storage device 216 may include a machine readable medium 222 on which may be stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the computer 200. In an example, one or any combination of the hardware processor 202, the main memory 204, the static memory 206, or the storage device 216 may constitute machine readable media.

While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the computer 200 and that cause the computer 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal. The term "transmission medium" shall be taken to include any intangible medium that is capable of storing, encoding or carrying instructions for execution by the computer 200, and includes digital or analog communications signals or other intangible medium to facilitate communication of such software.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. Thus, in some embodiments, the communication device 200 may be configured to operate according to protocols or standards such as IEEE 802.11 or other IEEE standards.

In an example, the network interface device 220 may include one or more physical jacks (e.g., Ethernet, coaxial, or phone jacks) or one or more antennas to connect to the communications network 226. In an example, the network interface device 220 may include one or more directional or omnidirectional antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. In some MIMO embodiments, the antennas may be effectively separated to take advantage of spatial diversity and the different channel characteristics that may result. The antennas may comprise dipole antennas, monopole antennas, patch antennas, loop antennas, microstrip antennas or other types of antennas suitable for transmission of RF signals.

As above, due to the rapid increase in number and type of STAs, improving spectrum efficiency has become increasingly desirable. In some embodiments, STAs may employ full-duplex communications using OFDMA to improve spectrum efficiency by allowing multiple STAs to simultaneously communicate uplink and downlink data and control signal communication with eNBs or access points (APs). Full-duplex and OFDMA techniques may have synergetic effects. For example, OFDMA may have significant performance benefit for small packet-based communications (such as video conferencing), with the gain diminishing with increasing packet size. Similarly, full-duplex communications, which as above permit a device (e.g., STA or AP) to transmit and receive on the same channel simultaneously (or set of channels such that simultaneous communications occur on each channel), may incur overheads in terms of full-duplex opportunity discovery, control message exchanges, etc. When judiciously combined, full-duplex and OFDMA may be able to minimize MAC-layer and other various protocol overhead associated with link scheduling, full-duplex opportunity discovery, etc., to operate with better spectrum efficiency than each is able to provide separately or by merely implementing both together without carefully designing the control communications. In particular, for OFDMA-based full-duplex systems, one issue arising is the manner in which to assign sub-carriers to (multiple) participating full-duplex links (e.g., AP-STA pairs) so that spectrum efficiency can be maximized. For example, different AP-STA pairs may use different amounts of bandwidth. Therefore, the overall sub-carrier (sub-channels) allocation in an OFDMA-based wireless system (e.g., 802.11ax and beyond) may be optimized through dynamic assignment considering the appropriate bandwidth to be provided for each link, as well the RF environment (e.g., channel condition, etc.) for the link.

FIGS. 3A and 3B illustrate a system and interactions of an AP and STAs. Specifically, FIG. 3A illustrates an AP in communication with STAs in accordance with some embodiments while FIG. 3B illustrates bandwidths of the communications of FIG. 3A in accordance with some embodiments. As shown, one or more STAs 304 may be within communication range of an AP 302 and may communicate wirelessly with the AP 302. The STAs 304 may be of the same type or may be different types. For example, the STAs 304 may include a smartphone, a laptop computer and an MTC device. The STAs 304 may, as shown, communicate with the AP 302 via simultaneous uplink and downlink transmissions. In some embodiments, while some of the STAs 304 may perform full-duplex communication with the AP, one or more of the STAs 304 may not have the capability of simultaneous communication with the AP 302 via uplink and downlink transmissions or further may only communicate with the AP 302 in one direction (e.g., uplink, such as a sensor). The AP 302 may provide data amongst the STAs 304 and/or between the STAs 304 and the network 306.

Each of the STAs 304 may communicate with the AP 302 using independently set channels and bandwidths. The bandwidth for each STA 304 may be the same for both uplink 310 and downlink 320 communications or may differ. Similarly, the bandwidths of the STAs 304 may all be the same, some may be the same and some different, or, as shown in FIG. 3B, may all be different. In the example shown in FIG. 3B, the bandwidth used by $STA_B$ ($BW_B$) 314 when communicating with the AP 302 is the smallest of the bandwidths used by the STAs 304, the bandwidth used by $STA_C$ ($BW_C$) 316 when communicating with the AP 302 is the largest of the bandwidths used by the STAs 304, and the bandwidth used by $STA_A$ ($BW_A$) 312 when communicating with the AP 302 is between the smallest and largest bandwidths. The frequency bands used by the STAs 304 may be different, as shown in FIG. 3B, or may overlap. In either embodiment, the communications between the STAs 304 and the AP 302 may be time-multiplexed such that communications between the AP 302 and the STAs 304 occur over different periods. The STAs 304 may be able to successfully decode received signals by canceling self-interference caused by co-located transmitters using self-interference cancellation (SIC) technologies implemented in their analog RF circuitry and digital signal processing. The SIC technologies may be able to cancel self-interference of up to 100-110 dB.

The bandwidth to each STA 304 may be dynamically allocated by the AP 302 based on current amount of communication or predicted amount of communication. The dynamic updating may take place when one or more predetermined conditions are met and may be individualized for each STA 304. For example, the dynamic updating may occur at predetermined time intervals, such as a predetermined number of frames or a predetermined number of seconds or minutes, after a predetermined amount of data has been communicated in one or both directions over a predetermined amount of time, and/or a change in the amount of data communicated in one or both directions over a predetermined amount of time has been exceeded. The predicted amount of communication may be based on the amount of communication over a predetermined period of time immediately prior to the update time. The historical amount of communication may be averaged over several periods, such as the last 3 times the bandwidth for update periods, or averaged over several similar periods of time of the day, such as 3 pm-3:15 pm.

In some embodiments, the AP 302 may discover and authenticate each STA 304 before establishing a connection therebetween using IEEE 802.11 WiFi authentication and association protocol. In some embodiments, the connection may be a secure (e.g., key-based) connection, such as using IEEE 802.11 authentication and generation of public-private pair encryption keys. In some embodiments, during the association each STA 304 may provide the AP 302 whether the STA 304 has full- and half-duplex capability or only half-duplex capability. In some embodiments, the AP 302 may use half-duplex communications as a default for a particular STA if no capacity information is provided by the particular STA or in cases in which traffic for the particular STA has primarily been in one direction (e.g., downlink) for an extended period of time (e.g., several frames) or for which traffic is expected to be in one direction for an extended period of time.

Figure 4A:
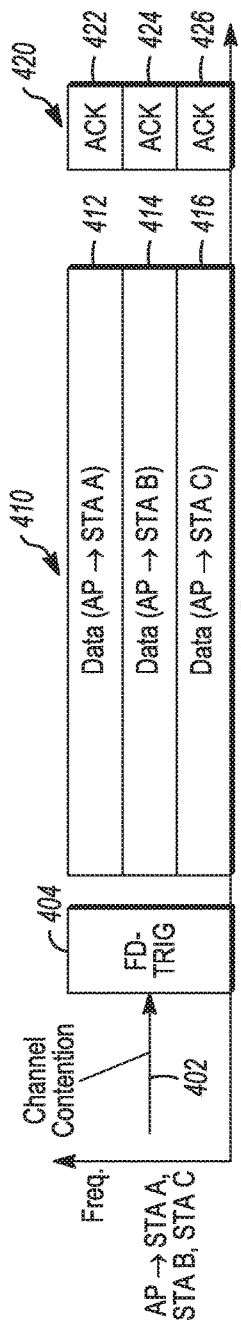
FIGS. 4A-4D illustrates a communication graph between an AP and different STAs in accordance with some embodiments.

FIGS. 4A-4D illustrates a communication graph between an AP and different STAs in accordance with some embodiments. FIG. 5 illustrates a flowchart of a communication method shown in FIGS. 4A-4D in accordance with some embodiments. In FIGS. 4A-4D, the communications between the AP and the STAs are shown as a function of time and frequency. The AP shown in FIGS. 4A-4D and described in the method of FIG. 5 may be the AP shown in FIG. 1 or 2.

The AP may enter a channel contention period 402 to communicate with one or more of the STAs. During the channel contention period 402, the AP may engage in channel contention at operation 502 with one or more of the STAs. Channel contention may be used when multiple communication devices contend for shared community network resources to gain access to the wireless medium. The IEEE 802.11 protocol uses different types of coordination processes to avoid collision between communications of the various STAs and the AP. The most common processes include the Distributed Coordination Function (DCF), in which the devices contend to gain access to the wireless medium without support for quality of service (QoS), and the Hybrid Coordination Function (HCF), which supports prioritized contention-based QoS services, and uses an Enhanced Distributed Coordination Access (EDCA) method.

In some embodiments, each communication device attempting to access the wireless medium (e.g., the STAs and, as shown in FIGS. 4A-4D and FIG. 5, the AP) detects whether the wireless medium is free. This may include the AP both physically sensing whether the wireless medium is being used via Clear Channel Assessment and virtually sensing whether the wireless medium is being used via a network allocation vector (NAV).

Once the AP determines that the wireless medium is clear, the AP may wait an Inter-Frame Space (IFS) interval, during which time the AP detects whether a particular channel desired to be used by the AP remains quiet before decrementing an individualized random backoff timer. Once the backoff timer of the AP reaches zero, and the wireless medium remains idle, the AP at operation 504 may determine that it has won channel contention and has the floor to transmit an allotted frame exchange, in accordance with a set of parameters associated with the transmission opportunity and to be determined by the AP.

Once the channel contention period 402 ends and the AP determines that it has won, the AP at operation 506 may identify full-duplex opportunities among the scheduled transmissions. A full-duplex opportunity for a STA may include both that the STA has full-duplex capability and that the STA has data for an uplink transmission while the AP has data for a downlink transmission to the STA. The AP may have been provided the capability of each STA when the STA attached to the AP. The STA may also prior to or during the channel contention process, transmit to the AP an indication that the STA has data for an uplink transmission. The AP may thus determine at operation 506 that multiple full-duplex opportunities exist among the attached STAs and the AP. The AP may communicate simultaneously with multiple STAs using sets of different channels.

At operation 508, the AP may calculate the optimal radio configurations for each of the uplink and downlink transmissions for each STA in which full-duplex communications are to occur. The radio configurations may include, for example, transmit power and modulation and coding scheme (MCS) for transmissions by each of the STA and AP. In some embodiments, the radio configuration may be stored in some or all of the STAs. In some embodiments, the radio configuration may be provided to at least one of the STAs by the AP immediately prior to the initiation of each full-duplex communication session with that STA or may be provided to the STA some time prior to the full-duplex communication session (e.g., when the STA attaches to the AP) and may further be periodically updated. For example, the radio configuration of a particular STA may be periodically updated as the channel conditions change (e.g., interference is detected on one or more channels/sets of sub-carriers) or as a new STA attaches to the AP, e.g., if the particular STA has a higher priority level than the STA. In some embodiments, the radio configuration of a particular STA may be optimized to minimize the transmission time for at least one full-duplex (uplink or downlink) link for the particular STA. In some embodiments, the radio configuration of a particular STA may be optimized to minimize at least one of the uplink and downlink transmission time across transmissions of the STAs in communication with the AP.

At operation 510, the expected transmission time for each full-duplex link of the STA may be calculated using the optimal radio configurations for that STA. Assuming a unit bandwidth of 2 MHz ($BW_{2MHz}$), which might be the basic resource unit in the IEEE 802.11ax standard, the AP may calculate the expected transmission time based on the use of a single channel, $E[T_i(BW_{2MHz})]$ for i=1, 2, . . . N, where N is number of full-duplex links. The expected transmission time may be based on channel conditions as well as the amount of data for transmission on one or both full-duplex links. As generally the amount of data for downlink transmission may be substantially greater than the amount of data for uplink transmission, the AP may use only the downlink data in the calculation for a relatively good approximation. In some embodiments, the AP may use a prediction algorithm based on previous time periods (e.g., immediately preceding full-duplex uplink transmissions or transmissions over a similar time period). In some embodiments, the STA may transmit prior to the full-duplex communication session the amount of data (or estimate of the amount of data) to be transmitted during the full-duplex communication session. In some embodiments, the AP may return to operation 508 to adjust the optimal radio configuration of the STA based on the expected transmission time for the STA (e.g., if the expected transmission time exceeds a predetermined maximum) and may take into account the expected transmission time for one or more other STAs. In one example, if the expected transmission time for a STA using a particular MCS exceeds a maximum transmission time such that even using a maximum amount of bandwidth to transmit data for the STA the expected transmission time would exceed that of other STAs by a significant amount (e.g., 5-10%), the MCS may be adjusted to reduce the expected transmission time for the STA.

After calculating the expected transmission time for the STA, at operation 512 the AP may then adjust a bandwidth allocation ($BW_i$) for each full-duplex link to minimize the expected transmission time. The bandwidth allocated may be adjusted inversely proportional to the expected transmission time based on a unit bandwidth:

$$\frac{E[T_A(BW_{2MHz})]}{BW_A} \approx \frac{E[T_B(BW_{2MHz})]}{BW_B} \approx \frac{E[T_C(BW_{2MHz})]}{BW_C} \text{ and} \quad (1)$$

$$BW_{total} = \sum_i BW_i \quad (2)$$

In this case, $E[T_i(BW_{2MHz})]/BW_i$ is essentially constant (and is a predetermined value) and $BW_{total}$ is the total available bandwidth to the AP for all communications with STAs. In some embodiments, the AP may allot a maximum bandwidth to each STA in which the maximum bandwidth proportional to the maximum bandwidth available to the AP. In this case, the maximum bandwidth able to be allotted to a particular STA may decrease with increasing number of STAs (e.g., if three STAs have full-duplex capabilities, the maximum bandwidth able to be allotted may be the maximum bandwidth available to the AP/3). The maximum bandwidth may or may not be based on QoS considerations of each STA. In some embodiments, the AP may reserve one or more channels for other reasons, such as for emergency communications or due to interference issues. In this case, less than the maximum bandwidth may be allotted by the AP to at least one of the STAs. In some embodiments, the ratio of $E[T_i(BW_{2MHz})]/BW_i$ may, as shown by equation (1) above, be approximately equal among the STAs and the expected transmission time changes proportional to a change in bandwidth to remain essentially constant. In other embodiments however, the expected transmission time may change proportional to a change in bandwidth but the ratio of $E[T_i(BW_{2MHz})]/BW_i$ may not be approximately equal among the STAs. Moreover, in other embodiments, the expected transmission time for at least one of the STA may not change proportional to a change in bandwidth so that the ratio of $E[T_i(BW_{2MHz})]/BW_i$ may vary with changing bandwidth for that STA. In some embodiments, some or all of the operations 506-512 may be performed by a network entity other than the AP and the results provided to the AP to transmit to the STAs.

Once the bandwidth for each STA has been adjusted at operation 512, the AP may at operation 514 transmit a full-duplex trigger 404 to the STAs. The AP may transmit the trigger 404 individually or may broadcast the trigger 404 to all STAs. The trigger 404, if broadcast, may comprise the STA identity, corresponding assigned set of sub-carriers (bandwidth) and the MCS for the STA to use for uplink transmissions. If the trigger 404 is sent individually to each STA, the trigger 404 may comprise the set of sub-carriers, the MCS and perhaps the transmit power for the STA to use for uplink transmissions. The STA, upon receiving the trigger frame, may extract the communication information, e.g., the set of sub-carriers, the MCS and the transmit power, for the STA to use during the full-duplex communication session, and configure the STA to transmit and receive data using the communication information during the full-duplex communication session.

At operation 516, the AP and STAs communicate using the calculated transmission parameters (e.g., MCS) via the assigned channels during a communication session 410. The communication session 410 may start a minimal interval after transmission of the full-duplex trigger 404. As shown in FIG. 4A, the AP may transmit downlink data 412, 414, 416 to the STAs across the entirety of the available bandwidth, using channels assigned to STA A to transmit data 412 to STA A, channels assigned to STA B to transmit data 414 to STA B and channels assigned to STA C to transmit data 416 to STA C. As indicated above, the bandwidth assigned to the STAs may be independent such that the assigned bandwidths may be the same or at least some may differ, as shown in FIGS. 4A-4D.

Figure 4B:
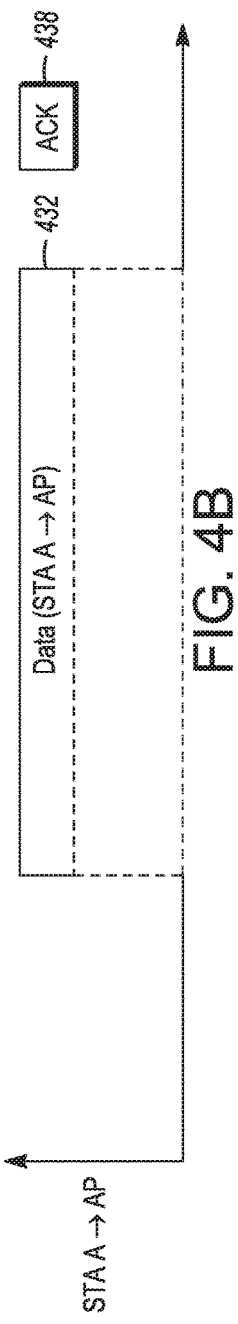
Figure 4C:
Figure 4D:
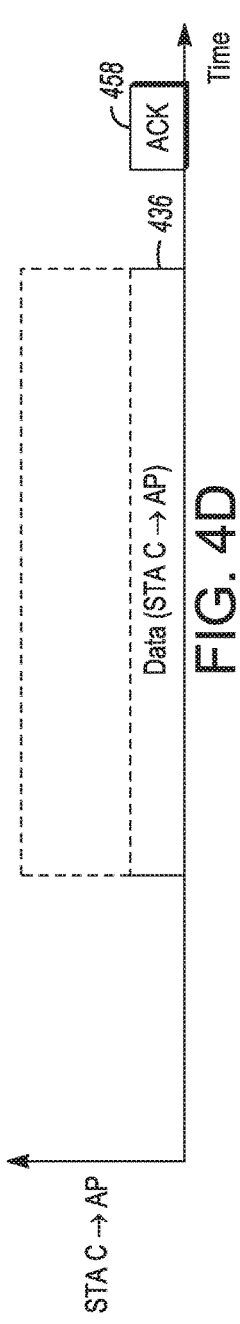
Figure 5:
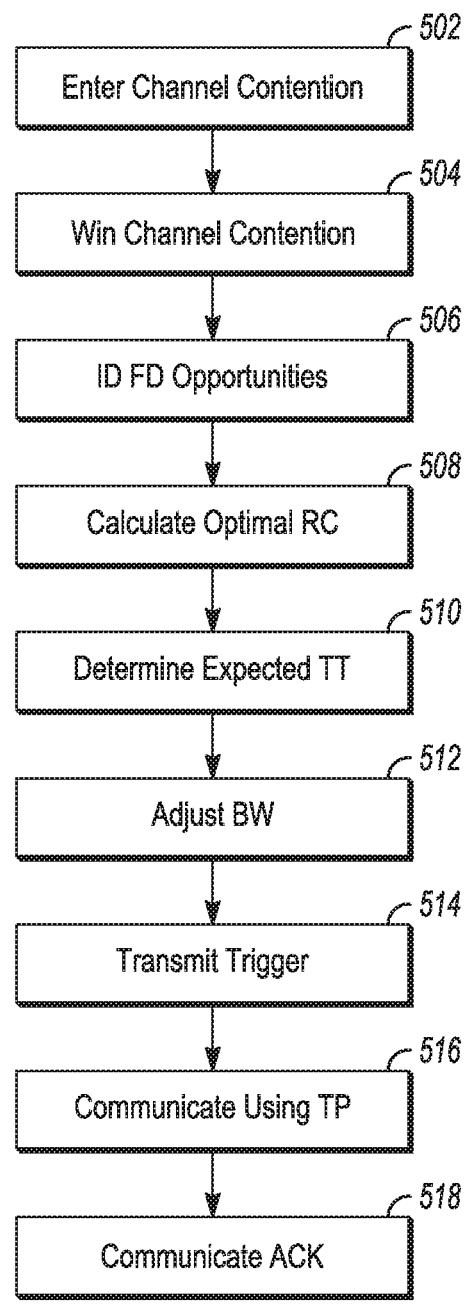
FIG. 5 illustrates a flowchart of a communication method shown in FIGS. 4A-4D in accordance with some embodiments.

FIGS. 4B-4D illustrate the different STAs transmitting uplink data 432, 434, 436 to the AP using the same channels as that respectively used for the same STAs on the downlink communications of FIG. 4A. The AP and each STA may communicate using a set of channels that includes one or more channels for the uplink transmission and one or more different channels for the downlink transmission. In some embodiments, the number of channels, and thus bandwidth, used for uplink and downlink transmissions may differ for a particular STA in addition to the above between different STAs. The AP may communicate with different STAs using different sets of channels. Although as shown in FIGS. 4A-4D the multiple channels used for either uplink (or downlink) communications between the AP and a particular STA may be adjacent, in some embodiments some or all of the channels may be separated (e.g., by unused channels). Similarly, in some embodiments, the channels used for uplink communications between the AP and a STA may wholly (as shown) or partially overlap the channels used for downlink communications between the AP and the STA. In some embodiments, the channels used for uplink communications between the AP and a STA may be entirely separated from the channels used for downlink communications between the AP and the STA. In some embodiments, the channels used for uplink and/or downlink communications between the AP and different STAs may be adjacent or may be separated.

The uplink communications may, as shown in FIGS. 4A-4D, terminate substantially the same time as downlink communications. Once the uplink and/or downlink communications between the AP and different STAs have completed, at operation 518, an acknowledgment period 420 may occur at the end of data transmission after an interval of no communications between the AP and the STAs. During the acknowledgment period 420, the AP may transmit an AP ACK packet 422, 424, 426 to each STA and/or the STAs may correspondingly transmit an STA ACK packet 438, 448, 458 to the AP. The ACK packets may indicate whether the communication device transmitting the ACK has successfully received and/or decoded data transmitted by the communication device receiving the ACK. In some embodiments, the AP may transmit the AP ACK packet 422, 424, 426 to each STA prior to receiving STA ACK packet 438, 448, 458, which each STA may transmit in response to receiving the AP ACK packet 422, 424, 426 or may transmit prior to receiving the AP ACK packet 422, 424, 426 but independent of receipt of the AP ACK packet 422, 424, 426. In some embodiments, each STA may transmit the STA ACK packet 438, 448, 458 to the AP prior to receiving the AP ACK packet 422, 424, 426, which the AP may transmit in response to receiving the STA ACK packet 438, 448, 458 but independent of receipt of the STA ACK packet 438, 448, 458.

Example 1 can include an apparatus a station (STA) comprising: a transceiver arranged to communicate with an access point (AP); and processing circuitry arranged to: configure the transceiver to receive, from the AP after the AP has won channel contention, a bandwidth for full-duplex communications with the AP using Orthogonal Frequency Division Multiple Access (OFDMA); and arrange the transceiver to communicate with the AP over the bandwidth during a full-duplex communication session in which uplink and downlink communications each comprising OFDMA signals are respectively transmitted to and received from the AP simultaneously over at least one channel of the bandwidth, wherein the bandwidth is independent of other bandwidths transmitted from the AP to other STAs and the at least one channel is different from channels of the other bandwidths.

Example 2 can include the subject matter of Example 1 and optionally include that the bandwidth is based on channel conditions to be used for the full-duplex communications with the AP and an amount of data for at least one of the uplink transmission and the downlink transmission.

Example 3 can include the subject matter of one or any combination of Examples 1-2 and optionally include that the bandwidth is based on the amount of data for the downlink transmission and is free from being based on the amount of data for the uplink transmission.

Example 4 can include the subject matter of one or any combination of Examples 1-3 and optionally include that an expected transmission time of the amount of data for the at least one of the uplink transmission and downlink transmission using a unit bandwidth divided by the bandwidth is set by the AP to be a predetermined value.

Example 5 can include the subject matter of one or any combination of Examples 1-4 and optionally include that arrange the transceiver to terminate the uplink communications with the AP at substantially the same time as the downlink communications are terminated.

Example 6 can include the subject matter of one or any combination of Examples 1-5 and optionally include that the processing circuitry is arranged to: arrange the transceiver to receive a trigger frame from the AP; extract communication information, comprising a set of sub-carriers forming the bandwidth and a modulation and coding scheme (MCS), from the trigger frame to use during the full-duplex communication session; and based on the extracted communication information, arrange the transceiver to communicate with the AP using the set of sub-carriers and MCS during the full-duplex communication session.

Example 7 can include the subject matter of one or any combination of Examples 1-6 and optionally include that the processing circuitry is arranged to: determine that the full-duplex communication session is completed; and in response to determining that the full-duplex communication session has completed, arrange the transceiver to at least one of: transmit a STA acknowledgment (ACK) packet to the AP indicating whether or not downlink data has been received from the AP, and receive an AP ACK packet from the AP indicating whether or not uplink data has been received by the AP.

Example 8 can include the subject matter of one or any combination of Examples 1-7 and optionally include that the processing circuitry is arranged to: prior to receiving the bandwidth from the AP, arrange the transceiver to transmit to the AP capabilities of the STA, the capabilities of the STA including that the STA is capable of full-duplex communications with the AP.

Example 9 can include the subject matter of one or any combination of Examples 1-8 and optionally include an antenna arranged to transmit and receive communications between the STA and the AP.

Example 10 may comprise an apparatus of an access point (AP) comprising: processing circuitry arranged to: arrange a transceiver to transmit, to a plurality of stations (STAs), a plurality of bandwidths for full-duplex communications with the AP using Orthogonal Frequency Division Multiple Access (OFDMA), each bandwidth comprising a plurality of channels, the bandwidths independent of each other; and arrange the transceiver to communicate with the STAs using the bandwidths during a full-duplex communication session in which uplink and downlink communications each comprising OFDMA signals are respectively transmitted to and received each STA simultaneously.

Example 11 can include the subject matter of Example 10 and optionally include that the processing circuitry is arranged to: calculate, for each STA, the bandwidth based on channel conditions to be used for the full-duplex communications with the STA and an amount of data for at least one of an uplink transmission and a downlink transmission with the STA.

Example 12 can include the subject matter of one or any combination of Examples 10-11 and optionally include that at least one of the bandwidths is based on the amount of data for the downlink transmission and is free from being based on the amount of data for the uplink transmission.

Example 13 can include the subject matter of one or any combination of Examples 10-12 and optionally include that the processing circuitry is arranged to: calculate, for each STA, an expected transmission time of the amount of data for the at least one of the uplink transmission and downlink transmission using a unit bandwidth; and determine the bandwidth for each STA such that a ratio of the expected transmission time divided by the bandwidth is approximately equal for the STAs.

Example 14 can include the subject matter of one or any combination of Examples 10-13 and optionally include that the processing circuitry is arranged to: prior to transmitting the bandwidths, arrange the transceiver to receive from the STAs capabilities of the STAs, the capabilities of each STA including that the STA is capable of full-duplex communications with the AP.

Example 15 can include the subject matter of one or any combination of Examples 10-14 and optionally include that the processing circuitry is arranged to: arrange the transceiver to terminate uplink communications with at least one of the STAs at substantially the same time as downlink communications are terminated.

Example 16 can include the subject matter of one or any combination of Examples 10-15 and optionally include that the processing circuitry is arranged to: arrange the transceiver to terminate uplink communications with each STA at substantially the same time.

Example 17 can include the subject matter of one or any combination of Examples 10-16 and optionally include that the processing circuitry is arranged to: for each of the STAs, determine communication information, including a set of sub-carriers and a modulation and coding scheme (MCS), for the STA to use during the full-duplex communication session; and arrange the transceiver to transmit to each STA a trigger frame comprising the set of sub-carriers and the MCS for the STA.

Example 18 can include the subject matter of one or any combination of Examples 10-17 and optionally include that the processing circuitry is arranged to: determine that the full-duplex communication session is completed; and in response to determining that the full-duplex communication session has completed, arrange the transceiver to at least one of: receive a STA acknowledgment (ACK) packet from at least one of the STAs indicating whether or not downlink data from the AP has been received at the at least one of the STAs, and transmit an AP ACK packet to at least one of the STAs indicating whether or not uplink data from the at least one of the STAs has been received at the AP.

Example 19 can include the subject matter of one or any combination of Examples 10-18 and optionally include that the processing circuitry is arranged to: enter a channel contention period; and determine that the channel contention period is over and that the AP has won channel contention prior to transmitting the bandwidths.

Example 20 may comprise a non-transitory computer-readable storage medium that stores instructions for execution by one or more processors of a station (STA) to arrange the STA to communicate with an access point (AP), the one or more processors to arrange the STA to: receive, from the AP, a bandwidth and a modulation coding scheme (MCS) for full-duplex communications with the AP using Orthogonal Frequency Division Multiple Access (OFDMA), the bandwidth comprising a set of sub-carriers; and communicate with the AP using the bandwidth during a full-duplex communication session in which uplink and downlink communications each comprising OFDMA signals are respectively transmitted to and received from the AP simultaneously, wherein the bandwidth is independent of other bandwidths transmitted from the AP to other STAs and is different from bandwidths of the other STAs.

Example 21 can include the subject matter of Example 20 and optionally include that the bandwidth is based on channel conditions and an amount of data for a downlink transmission; and an expected transmission time of the amount of data using a unit bandwidth divided by the bandwidth is set by the AP to be a predetermined value.

Example 22 can include the subject matter of one or any combination of Examples 20-21 and optionally include that the one or more processors further arrange the STA to: terminate uplink communications at substantially the same time as downlink communications are terminated.

Example 23 may comprise a method of providing full-duplex communications between a plurality of stations (STAs) and an access point (AP), the method comprising: transmitting, from the AP to each of the STAs, a trigger frame comprising a set of sub-carriers and a modulation coding scheme (MCS) for full-duplex communications with the AP using Orthogonal Frequency Division Multiple Access (OFDMA); and communicating, for each STA and the AP, simultaneously during a full-duplex communication session, the full-duplex communication session associated with each STA comprising uplink and downlink communications each comprising OFDMA signals respectively transmitted to and received from the AP simultaneously over the set of sub-carriers, wherein the number of sub-carriers in each set are independent of each other and the sub-carriers of each STA are different from the sub-carriers of the other STAs.

Example 24 can include the subject matter of Example 23 and optionally include that the set of sub-carriers is based on channel conditions and an amount of data for a downlink transmission; and an expected transmission time of the amount of data using a unit bandwidth divided by a bandwidth forming the set of sub-carriers is set by the AP to be a predetermined value.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of a station (STA) comprising:
   a transceiver arranged to communicate with an access point (AP); and
   processing circuitry arranged to:
   configure the transceiver to receive, from the $AP^I$ after the AP has won channel contention, a bandwidth for full-duplex communications with the AP using Orthogonal Frequency Division Multiple Access (OFDMA); and
   arrange the transceiver to communicate with the AP over the bandwidth during a full-duplex communication session in which uplink and downlink communications each comprising OFDMA signals are respectively transmitted to and received from the AP simultaneously over at least one channel of the bandwidth, wherein the bandwidth is independent of other bandwidths transmitted from the AP to other STAs and the at least one channel is different from channels of the other bandwidths,
   wherein the bandwidth is dependent on an amount of data for at least one of the uplink transmission or the downlink transmission, and
   wherein an expected transmission time of the amount of data for the at least one of the uplink transmission or downlink transmission is set to a predetermined number of bandwidth units.

2. The apparatus of claim 1, wherein:
   the bandwidth is further based on channel conditions to be used for the full-duplex communications with the AP.

3. The apparatus of claim 2, wherein:
   the bandwidth is based on the amount of data for the downlink transmission and is free from being based on the amount of data for the uplink transmission.

4. The apparatus of claim 1, wherein the processing circuitry is arranged to:
   arrange the transceiver to terminate the uplink communications with the AP at substantially the same time as the downlink communications are terminated.

5. The apparatus of claim 1, wherein the processing circuitry is arranged to:
   arrange the transceiver to receive a trigger frame from the AP;
   extract communication information, comprising a set of sub-carriers forming the bandwidth and a modulation and coding scheme (MCS), from the trigger frame to use during the full-duplex communication session; and
   based on the extracted communication information, arrange the transceiver to communicate with the AP using the set of sub-carriers and MCS during the full-duplex communication session.

6. The apparatus of claim 1, wherein the processing circuitry is arranged to:
   determine that the full-duplex communication session is completed; and
   in response to determining that the full-duplex communication session has completed, arrange the transceiver to at least one of: transmit a STA acknowledgment (ACK) packet to the AP indicating whether or not downlink data has been received from the AP, and receive an AP ACK packet from the AP indicating whether or not uplink data has been received by the AP.

7. The apparatus of claim 1, wherein the processing circuitry is arranged to:
prior to receiving the bandwidth from the AP, arrange the transceiver to transmit to the AP capabilities of the STA, the capabilities of the STA including that the STA is capable of full-duplex communications with the AP.

8. The apparatus of claim 1, further comprising an antenna arranged to transmit and receive communications between the STA and the AP.

9. An apparatus of an access point (AP) comprising:
processing circuitry arranged to:
calculate, for each of a plurality of stations (STAs), a bandwidth for full-duplex communications with the AP using Orthogonal Frequency Division Multiple Access (OFDMA), each bandwidth comprising a plurality of channels and based on an amount of data for at least one of an uplink transmission or a downlink transmission with the STA, the bandwidths independent of each other;
calculate, for each STA, an expected transmission time of the amount of data for the at least one of the uplink transmission or downlink transmission using a unit bandwidth, wherein the bandwidth is determined for each STA such that a ratio of the expected transmission time divided by the bandwidth is approximately equal for the STAs:
provide to a particular STA, via a transceiver, the bandwidth calculated for the particular STA; and
arrange the transceiver to communicate with the STA s using the bandwidths during a full-duplex communication session in which uplink and downlink communications each comprising OFDMA signals are respectively transmitted to and received each STA simultaneously.

10. The apparatus of claim 9, wherein the processing circuitry is arranged to:
calculate, for each STA, the bandwidth further based on channel conditions.

11. The apparatus of claim 10, wherein:
at least one of the bandwidths is based on the amount of data for the downlink transmission and is free from being based on the amount of data for the uplink transmission.

12. The apparatus of claim 10, wherein the processing circuitry is further arranged to:
reserve a channel that would otherwise be allocated to one of the STAs for at least one of emergency communications or due to interference issues.

13. The apparatus of claim 9, wherein the processing circuitry is arranged to:
prior to transmitting the bandwidths, arrange the transceiver to receive from the STAs capabilities of the STAs, the capabilities of each STA including that the STA is capable of full-duplex communications with the AP.

14. The apparatus of claim 9, wherein the processing circuitry is arranged to:
arrange the transceiver to terminate uplink communications with at least one of the STAs at substantially the same time as downlink communications are terminated.

15. The apparatus of claim 14, wherein the processing circuitry is arranged to:
arrange the transceiver to terminate uplink communications with each STA at substantially the same time.

16. The apparatus of claim 9, wherein the processing circuitry is arranged to:
for each of the STAs, determine communication information, including a set of sub-carriers and a modulation and coding scheme (MCS), for the STA to use during the full-duplex communication session; and
arrange the transceiver to transmit to each STA a trigger frame comprising the set of sub-carriers and the MCS for the STA.

17. The apparatus of claim 9, wherein the processing circuitry is arranged to:
determine that the full-duplex communication session is completed; and
in response to determining that the full-duplex communication session has completed, arrange the transceiver to at least one of: receive a STA acknowledgment (ACK) packet from at least one of the STAs indicating whether or not downlink data from the AP has been received at the at least one of the STAs, and transmit an AP ACK packet to at least one of the STAs indicating whether or not uplink data from the at least one of the STAs has been received at the AP.

18. The apparatus of claim 9, wherein the processing circuitry is arranged to:
enter a channel contention period; and
determine that the channel contention period is over and that the AP has won channel contention prior to transmitting the bandwidths.

19. A non-transitory computer-readable storage medium that stores instructions for execution by one or more processors of a station (STA) to arrange the STA to communicate with an access point (AP), the one or more processors to arrange the STA to:
receive, from the AP, a bandwidth and a modulation coding scheme (MCS) for full-duplex communications with the AP using Orthogonal Frequency Division Multiple Access (OFDMA), the bandwidth comprising a set of sub-carriers; and
communicate with the AP using the bandwidth during a full-duplex communication session in which uplink and downlink communications each comprising OFDMA signals are respectively transmitted to and received from the AP simultaneously, wherein the bandwidth is independent of other bandwidths transmitted from the AP to other STAs and is different from bandwidths of the other STAs,
wherein the bandwidth is based on an amount of data for a downlink transmission, and
wherein an expected transmission time of the amount of data is set to a predetermined number of bandwidth units.

20. The medium of claim 19, wherein:
the bandwidth is further based on channel conditions.

21. The medium of claim 19, wherein the one or more processors further arrange the STA to:
terminate uplink communications at substantially the same time as downlink communications are terminated.

22. A method of providing full-duplex communications between a plurality of stations (STAs) and an access point (AP), the method comprising:
transmitting, from the AP to each of the STAs, a trigger frame comprising a set of sub-carriers and a modulation coding scheme (MCS) for full-duplex communications with the AP using Orthogonal Frequency Division Multiple Access (OFDMA); and
communicating, for each STA and the AP, simultaneously during a full-duplex communication session, the full-duplex communication session associated with each STA comprising uplink and downlink communications each comprising OFDMA signals respectively transmitted to and received from the AP simultaneously over the set of sub-carriers, wherein the number of sub-carriers in each set are independent of each other and the sub-carriers of each STA are different from the sub-carriers of the other STAs, wherein the set of sub-carriers is based on an amount of data for a downlink transmission; and an expected transmission time of the amount of data is set to a predetermined number of bandwidth units.

23. The method of claim 22, wherein:

the set of sub-carriers is further based on channel conditions.

* * * * *